Oct. 21, 1969    H. U. LEFFERS    3,473,444

PISTON ASSEMBLY PARTICULARLY FOR REFRIGERATION COMPRESSORS

Filed July 6, 1967

United States Patent Office 3,473,444
Patented Oct. 21, 1969

3,473,444
PISTON ASSEMBLY PARTICULARLY FOR REFRIGERATION COMPRESSORS
Hans Ulrik Leffers, Sonderborg, Denmark, assignor to Danfoss A/S, Nordborg, Denmark, a company of Demark
Filed July 6, 1967, Ser. No. 651,490
Claims priority, application Germany, July 15, 1966, D 50,585
Int. Cl. F01p 11/00; F16j 1/04
U.S. Cl. 92—176
7 Claims

ABSTRACT OF THE DISCLOSURE

A piston assembly in which the piston has a hollow skirt in which is inserted an insert jointly defining with the inner surfaces of the piston crown and skirt a space which is hermetically sealed and contains a gas having poorer heat transfer characteristics than air. The piston and insert are assembled in a carbon dioxide atmosphere that results in the space being partially evacuated as the carbon dioxide cools. A bearing block is attached to the insert and is finished with the other parts independently of a piston rod which has a ball received in a hemispherical socket seat in the bearing block and to which is attached a crank pin bearing comprising a ring with an eccentric opening.

---

This invention relates generally to piston assemblies for reciprocating machines and more particularly to a piston assembly for use in refrigeration compressors.

Piston assemblies are known in which the piston rod is connected to the piston by means of a ball received in a socket in the piston. One type of such an assembly is known in which one-half of the socket is cast integrally with the piston and is joined to the peripheral wall or skirt of the piston as a transverse partition supported by ribs. The other half of the socket for the ball of the piston rod is subsequently mounted to the transverse partition by screws.

A disadvantage of this type of piston construction is that a part of the socket has to consist of the same material as the piston. Thus a considerable amount of heat flows through the ribs to the bearing surface of the socket where it may cause carbonization and stresses may be set up in the piston when the second half of the socket is screwed on tightly and may even require exceeding permissible limits of deformation. Moreover the use of the same material for the piston and the socket can be disadvantageous as far as heat transfer characteristics of the socket material are considered relative the heat transfer characteristics and problems of the piston itself.

It has been suggested to produce the socket from a different material than the piston and to fix it in the piston afterwards. This construction, however, necessitates large contacting surfaces so that the surfaces of the bearing are heated even more than in other constructions. Moreover the fasteners used in securing the socket to the piston increase the weight and mass of the assembly and can cause deformation of the piston itself.

It is true that deformation of pistons in such constructions can be reduced by making the piston relatively solid and rigid, however, this increases the transfer of heat from the piston to the bearing surfaces of the socket connected to the piston rod thus increasing the problems of proper lubrication. Moreover, the more solid and rigid the piston is made the greater the mass of the moving assembly so that balancing becomes even more difficult particularly in single-cylinder reciprocating machines.

It is a principal object of the present invention to provide a new and improved piston assembly in which heat transfer from the piston to the bearing surfaces is low and the moving mass is maintained at minimum size while deformation of the piston is avoided or is negligibly small.

A feature of the invention is the provision of a piston designed as a hollow cylinder having one end closed defining the crown thereof and the cylinder walls defining the skirt. A socket insert is inserted within the hollow skirt and is provided with a peripheral flange that is secured to the open end of the piston cylinder or skirt. The socket insert and the inner surfaces of the crown and the skirt define a gas-containing space which is hermetically sealed. The assembly of these component parts takes place in an atmosphere and state that will entrap some of the gas in this space which will reduce heat transfer therebetween.

In this construction the socket is thermally insulated from the piston by the intervening space and heat can only pass from the end of the piston skirt to the socket by travelling the full length of the piston skirt and then through the flange on the socket insert. A large portion of the heat is thus dissipated through the cylinder walls and through the exposed surface of the flange which is favorably situated for being sprayed with lubricant. The insert and flange insure a substantially greater rigidity or strength of the piston itself and the elements employed may therefore be made thin-walled in order to reduce the weight of the moving mass.

Another feature of the invention is that the socket insert has a substantially conical portion connected to the flange. This intermediate portion serves to compensate for deformation which may be produced due to the fact that the socket is fastened inside the piston. Moreover, the intermediate part in being made conically provides larger surfaces for wetting by oil which increases the dissipation of heat through the lubricant.

In a preferred embodiment of the invention the flange is hermetically sealed to the piston skirt and the space defined therebetween is hermetically sealed and thus prevents oil from entering this insulating space between the piston skirt, crown and socket insert during operation. Moreover the assembly of these parts results in the protective gas being trapped in a heated state in the space defined within the piston jointly with the socket insert. As the assembly is cooled after assembly thereof the space becomes cooled and the entrapped gas cools so that the space becomes substantially evacuated and the partial vacuum reduces the transfer of heat during operation.

The socket insert has a bearing block thereon. The points of connection between the insert and the bearing block are axially displaced relative to the points of connection between the insert and the piston. The bearing block has a hemispherical socket seat in which a ball connected to the piston rod is received and held for connecting the piston rod to the piston. The bearing block is connected to the insert only with a portion spaced apart from the transverse median plane of the ball so that as a result no fastening pressure is set up in the region where the socket has its larger diameter so that seizing of the ball in the socket is avoided.

The bearing block is mounted in the insert by shrinking it on. Either the bearing block is chilled or preferably the hollow piston with the insert is heated and shrunk on. The surface of contact between the bearing block and its insert are large enough to obtain sufficient shrinking forces and even though these large surfaces are provided they in no way effect heat transfer between the piston and the bearing block. The bearing block can likewise be externally threaded and connected to the insert by being threaded onto an internal thread of the insert.

Another feature of the invention is the provision of a crank pin bearing made as a ring having an eccentric opening or bore and having at the point of connection the thicker section of the ring. Thus the ring can be made to further save weight in the assembly.

Other features and advantages of the piston assembly in accordance with the invention will be understood as described in the following specification and appended claims, in conjunction with the following drawing in which:

Figure 1:
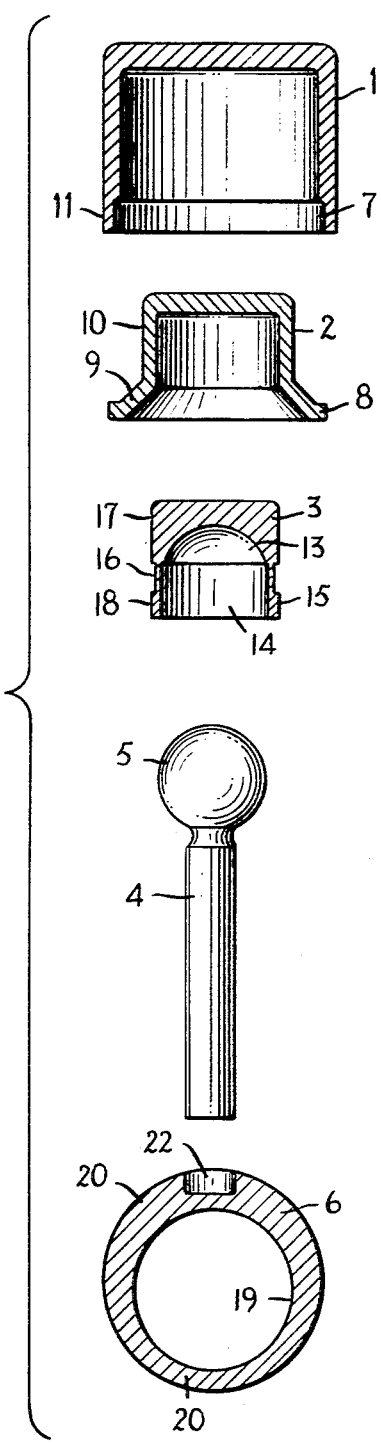
FIG. 1 is an exploded view of a piston assembly embodying the invention.

While the piston assembly herein described is applicable to refrigeration compressors, for example hermetically sealed refrigeration compressors, having a single cylinder the invention is equally applicable to other types of compressors and reciprocating machines.

The piston assembly comprises a pot-shaped hollow cylinder 1 defining a piston having a skirt and one end of the cylinder is closed defining the crown of the piston with the opposite end of the skirt being open. An insert 2 is received within the hollow cylinder or skirt of the piston 1 to which is secured a bearing block 3 for connecting a piston rod 4, having a ball or ball head 5 thereon, and a crank pin bearing 6 to the piston. The components 2 and 3 will hereinafter be referred to as the "insert" or "socket."

The hollow piston 1 may be, for example, drawn from sheet metal and provided at its open skirt end with a circumferential inner recess 7 receiving a flange 8 on the insert connected thereto by an intermediate conical portion or region 9.

The insert 2 is placed with its flange in the recess 7 and a cylindrical wall 10 thereof is circumferentially spaced from the inner surfaces of the skirt. The flange 8 is secured, for example by brazing, welding or soldering depending upon the materials used for the component parts, to the rim 11 of the skirt open end. In the instant case the parts 8, 11 are soldered together. The insert is cup-shaped and is provided with a bottom which is likewise axially spaced from the inner surfaces of the crown of the piston so that a space 12 free of any ribs or projections or whatever joining the piston and the insert is provided and contact is only made between the piston skirt and the insert through the flange 8 and the rim 11.

Preferably the two main piston components, the insert 2 and the cylinder 1, are hermetically sealed together in a protective atmosphere. During the sealing operation part of the protective atmosphere, for example an atmosphere of carbon dioxide, is entrapped in the space 12 between the insert and the piston skirt inner surface and the inner surfaces of the crown. The carbon dioxide will be at the temperature at which soldering or sealing takes place and then cools down so that at an operating temperature of about 200° C. a vacuum exists within the space 12. The protective gas trapped in the piston chamber 12 at first has a temperature in the order of 800° to 1200° C. Cooling produces the desired vacuum.

It will be remembered that as a conductor of heat the protective gas, carbon dioxide in the space 12 is inferior to air. The thermal conductivity of steel is 45 kcal./ m.$^2 \times m \times h \times °$ C. at 20° C., air has a thermal conductivity of 0.019 and $CO_2$ a conductivity of 0.0114 at 20° C. at one atmosphere. Thus the thermal conductivity between the piston and the bearing block is greatly reduced. Moreover, the assembly results in a very rigid piston structure even though the piston crown and skirt are thin-walled.

The bearing block 3 is provided with a bearing surface 13 which has a hemispherical configuration. This bearing surface or socket seat terminates in the portion above a center 14 of the sphere defined by the socket. The bearing block is provided with a continuation of the bearing surfaces defining a bore 15 having the same diameter as the ball head 5 of the piston rod. A recess 16 disposed circumferentially of the bearing block reduces the diameter of the continuation of the block and the mounting surfaces are on a section 17 of the bearing block. The reduced thickness of the continuation of the bearing surfaces at recess 16 prevents pressure being exerted in the region where the ball 5 has its largest diameter. A rim 18 provided on the open end of the seat continuation circumferentially of the bore 15 has an increased thickness and is flanged inwardly for assembling the rod to the pison as hereinafter described.

Figure 2:
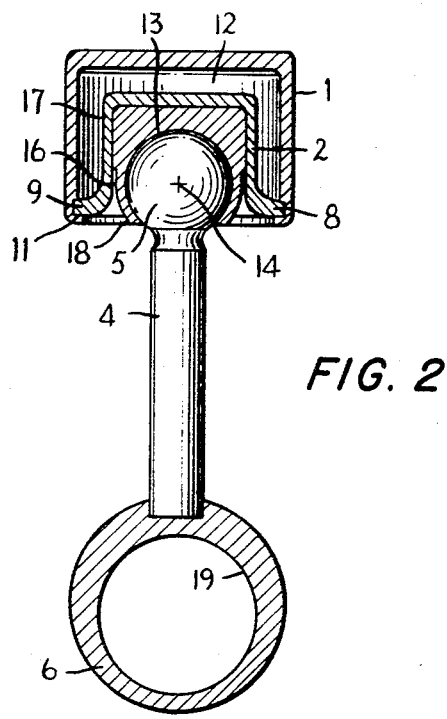
FIG. 2 is a longitudinal view partly in section of the piston assembly in FIG. 1.

The piston connecting rod comprises a rod 4 to which a ball 5 of hardened material is welded. This piston rod is finished separately from the piston. The crank pin bearing 6 comprises a ring with an eccentric bore 19 so that the thickness of a wall 20, on a side adjacent the piston, is larger than the thickness of a wall 21 on the opposite side. Consequently the connecting rod 4 can be readily mounted in a bore 22 provided in the wall 20 of the ring without the thickness of this wall being continued over the whole circumference of the ring and thereby the weight of the ring is decreased or maintained to a minimum. The connecting rod is first connected to the crank pin bearing ring and the bearing block 3 is slipped on the ball 5 and then the rim 18 is flanged over as shown in FIG. 2 securely holding the ball 5 in the socket.

It will be understood that at this stage the components of the piston have been fully machined separately from the piston rod and the piston rod in its ball have been independently finished and joined to one another. For example, the piston cylinder 1 and insert 2 are heated to about 300° C. and then shrunk on the surface or portion 17 of the bearing block. During this shrinking the piston is not deformed since the stresses set up are absorbed by the intermediate conical portion 9 and the adjacent portion of the cylindrical insert. The socket is then machined or ground and then the piston 1, 2, 3, and the piston rod 4, 5, 6 are joined as before described.

Those skilled in the art will understand the transfer of heat from the end face or crown of the piston to the bearing surface 13 is substantially prevented. Any transfer of heat through the space 12 is prevented by the poor thermal conductivity characteristics of the gas entrapped in the space 12 which is generally at a reduced pressure. Heat is thus conducted only through the lower end of the skirt of the piston and the flange 8 which is joined with the intermediate portion 9 and the adjoining cylindrical wall portion 10. In this way a large part of the heat is dissipated and the oil sprayed on the flange and the conical intermediate portion 9 tends to dissipate a considerable amount of heat. Moreover, those skilled in the art will see that the advantage of low heat and low deformability as well as low operating temperatures of the bearing can be accomplished if the bearing block is designed as a single piece, not shown, provided with the flange 8.

While a preferred embodiment of the invention has been illustrated and described it will be understood that many modifications and changes can be made within the true spirit and scope of the invention.

What I claim and desire to be secured by Letters Patent is:

1. In combination, a piston having a crown and a hollow skirt, means internally of said piston skirt defining a gas-containing space bounded by said crown and skirt, a gas having a lower heat transfer coefficient than air in said space.

2. The combination according to claim 1, in which said gas comprises carbon dioxide, and in which said space is partially evacuated.

3. The combination according to claim 1, in which said means internally of said skirt comprises an insert spaced from inner surfaces of said crown and skirt and having a flange hermetically secured adjacent the open end of said skirt, whereby said gas-containing space is a hermetically sealed space, and said flange being the only part of said insert contacting said inner surfaces of said skirt.

4. The combination according to claim 3, including a bearing block on said insert externally of said gas-containing space, said bearing block including means to secure a piston rod thereto.

5. The combination according to claim 4, including a piston rod connected to said bearing block.

6. The combination according to claim 5, said piston having a ball on one end secured to said bearing block, and said bearing block having means defining a hemispherical seat in which said ball is received.

7. The combination according to claim 4, including a crank pin bearing connected to an end of said piston rod opposite to an end having said ball thereon, said crank pin bearing comprising a ring having an eccentric opening therein.

References Cited

UNITED STATES PATENTS

| 1,386,144 | 8/1921 | Wall | 92—176 |
| 1,784,837 | 12/1930 | Hiatt. | |
| 1,878,566 | 9/1932 | Woolson | 123—41.16 |
| 3,241,226 | 3/1966 | Jorgji | 29—156.5 |
| 3,286,535 | 11/1966 | Schrader | 74—579 X |

FOREIGN PATENTS

| 308,193 | 10/1918 | Germany. |
| 965,449 | 2/1950 | France. |

CARROLL B. DORITY, Jr., Primary Examiner

U.S. Cl. X.R.

92—208, 214